United States Patent Office.

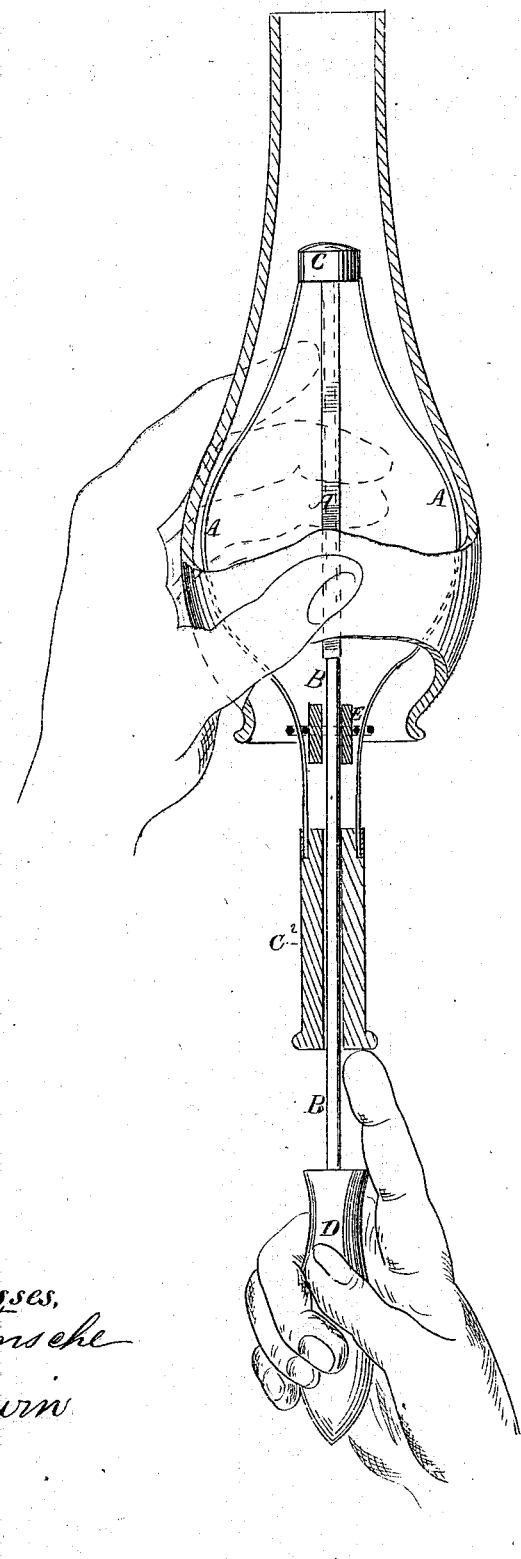

JOHN H. LIGHTNER, OF SHIRLEYSBURG, PENNSYLVANIA.

*Letters Patent No. 71,396, dated November 26, 1867.*

IMPROVEMENT IN LAMP-CHIMNEY CLEANERS.

The Schedule referred to in these Letters Patent and making part of the same.

TO ALL WHOM IT MAY CONCERN:

Be it known that I, JOHN H. LIGHTNER, of Shirleysburg, in the county of Huntingdon, and State of Pennsylvania, have invented a new and improved "Lamp-Chimney Cleaner;" and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

The lamp-chimney cleaner embraced in this invention is formed of a series of spring-bands, curved or bent from end to end, and secured at each end to and about a common centre-stem or rod, in the same direction therewith, in combination with a slide, or collar, or ring, so applied to the said springs that, when moved up or down thereon, it will compress such springs against the centre-rod or stem, or allow them to expand therefrom, so as to more fully and perfectly adapt the implement to the size of the interior of the globe or chimney in connection with which it is to be used.

In the accompanying plate of drawings my improved implement for cleaning lamp-chimneys is illustrated, the figure being a side view of the implement in connection with a lamp-chimney.

A, in the drawings, represents a series of metal spring-bands, that, from end to end, are each made of a curved or bent shape. These springs are secured to and about a centre-stem or rod, B, and in the same line or direction therewith, they being fastened at each end to collars C $C^2$, the one, C, permanently affixed to the said stem B, with the other, $C^2$, loose, so that it can be slid up and down thereon. D, the handle to the implement, and E a collar or ring, placed on springs A, and so arranged as to be slid thereon from one end to the other. This collar, as it is moved up from the handle, compresses the spring-bands A about the stem B, but allows them to expand or open as it is moved back toward the handle, the springs holding the collar firmly at any point where it is left.

By means of the sliding collar E the spring-bands can be adjusted to more perfectly fit and correspond to the interior surface of the lamp-chimney or globe in which they are to be used, and thus secure a more perfect cleaning thereof with the wiping material used upon them, by sliding the collar $C^2$ upward on the stem B sufficiently to bring the bands to bear against the walls of the lamp-chimney, and then turning the implement around within the chimney.

Having thus described my invention, I claim as new, and desire to secure by Letters Patent—

An implement for cleaning lamp-chimneys, formed of spring-bands A, fixed at each end to a centre-stem, B, in combination with the slide or collar E, substantially as and for the purpose described.

JOHN H. LIGHTNER.

Witnesses:
  E. A. MYERS,
  PETER BURKET.